(12) United States Patent
Cress

(10) Patent No.: US 6,632,017 B1
(45) Date of Patent: Oct. 14, 2003

(54) THERMOCOUPLE METHOD AND APPARATAS

(76) Inventor: Steven B. Cress, P.O. Box 30, Glenbrook, NV (US) 89413

( * ) Notice: Subject to any disclaimer, the term of this patent is extended or adjusted under 35 U.S.C. 154(b) by 40 days.

(21) Appl. No.: 09/695,398

(22) Filed: Oct. 23, 2000

Related U.S. Application Data

(62) Division of application No. 09/301,809, filed on Apr. 28, 1999.

(51) Int. Cl.$^7$ .................................................. G01K 7/04
(52) U.S. Cl. ........................................ 374/179; 136/230
(58) Field of Search ..................... 374/179, 208, 374/180, 181, 182; 136/230

(56) References Cited

U.S. PATENT DOCUMENTS

| | | | | |
|---|---|---|---|---|
| 2,645,756 A | * | 7/1953 | Goodwin, Jr. ............ | 374/181 |
| 2,962,898 A | * | 12/1960 | Burling et al. ............ | 374/182 |
| 3,011,005 A | * | 11/1961 | Silver .......................... | 374/179 |
| 4,390,290 A | * | 6/1983 | O'Neill et al. ............. | 374/179 |
| 4,499,330 A | * | 2/1985 | Pustell ........................ | 374/208 |
| 5,464,485 A | * | 11/1995 | Hall, Jr. ..................... | 374/179 |
| 5,520,461 A | * | 5/1996 | Curry et al. ............... | 374/179 |
| 5,772,324 A | * | 6/1998 | Falk ............................ | 374/179 |
| 6,054,678 A | * | 4/2000 | Miyazaki .................... | 374/182 |

* cited by examiner

Primary Examiner—Diego Gutierrez
Assistant Examiner—Madeline Gonzalez

(57) ABSTRACT

A thermocouple sensing element comprising a first electrically conductive member formed of one of two dissimilar metals and a second electrically conductive member formed of the second of the two dissimilar metals attached to the first electrically conductive member, and located within the first electrically conductive member, the first electrically conductive member and the second electrically conductive member forming two elements which generate an electrical potential difference under varying conditions of heat.

5 Claims, 3 Drawing Sheets

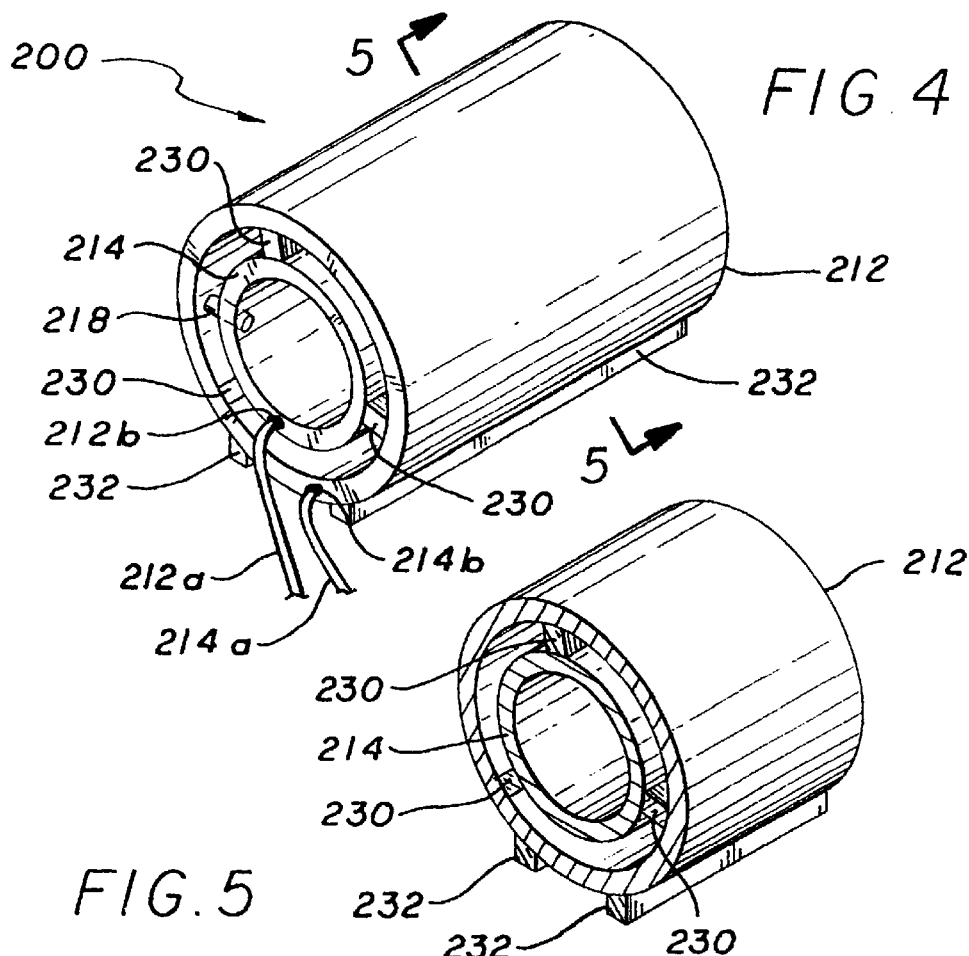
FIG. 4
FIG. 5
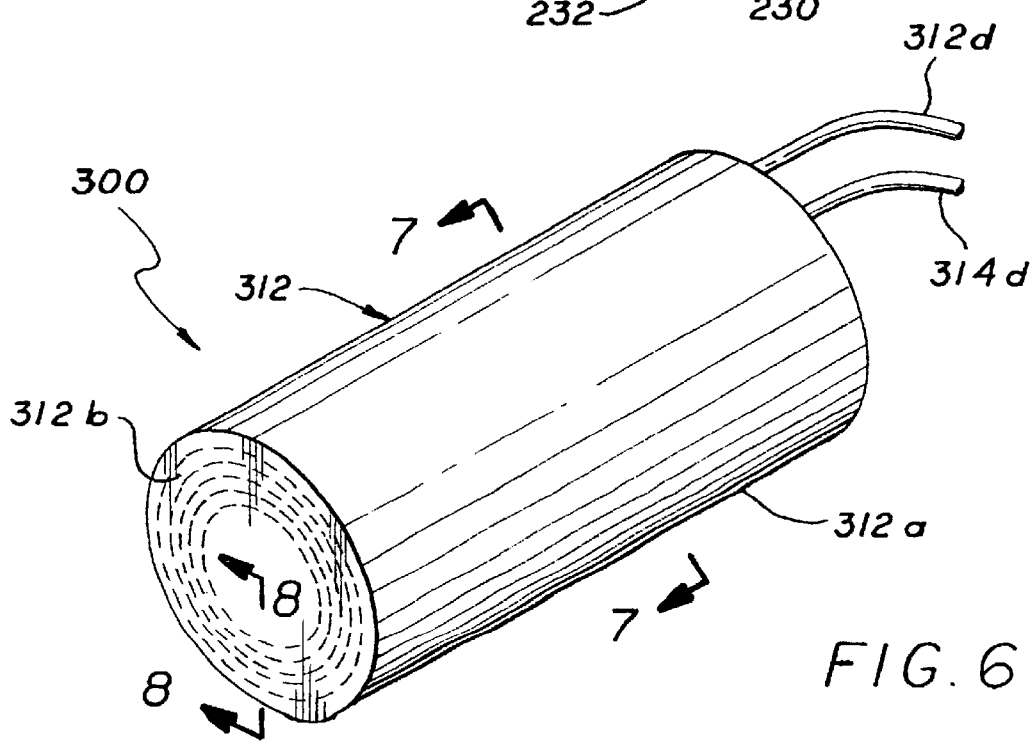
FIG. 6

FIG. 7
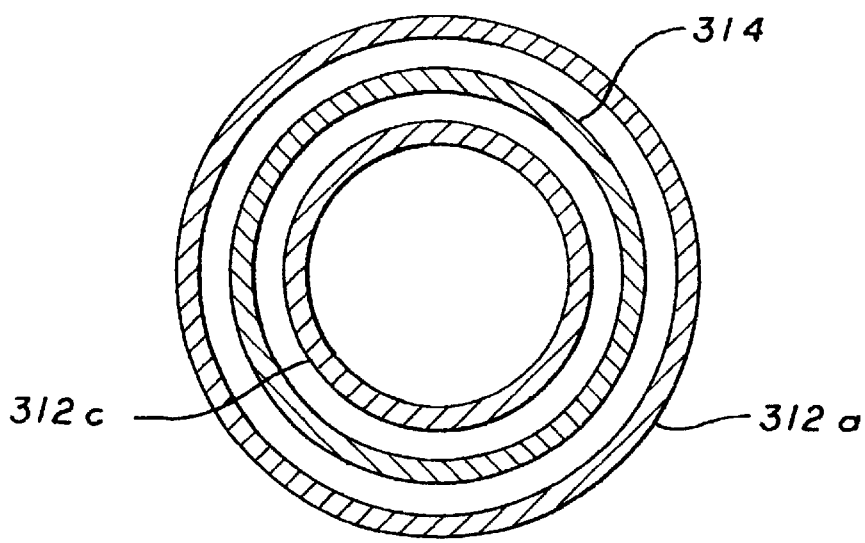
FIG. 8a
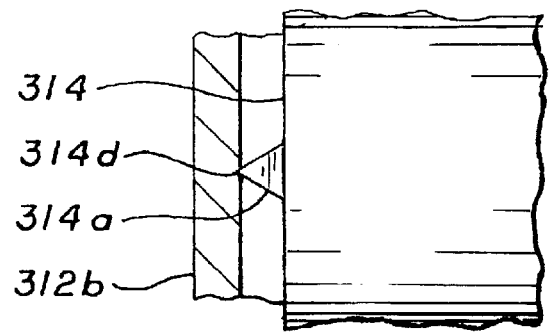
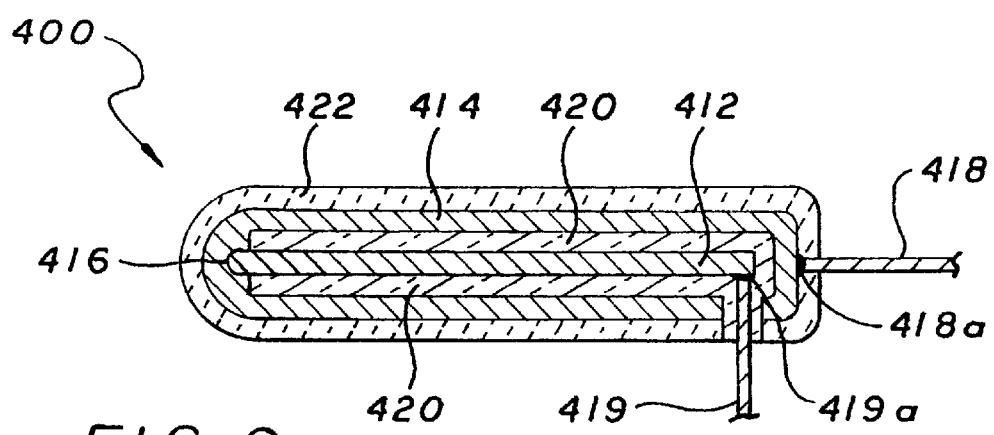
FIG. 9

THERMOCOUPLE METHOD AND APPARATAS

CROSS REFERENCE TO RELATED PATENT APPLICATIONS

This application is related to and is a division of my co-pending application of the same title, Ser. No. 09/301,809 filed Apr. 28, 1999.

BACKGROUND OF THE INVENTION

I. FIELD OF THE INVENTION

This invention is in the general field of temperature control and indicating systems;

The invention is more particularly directed to thermocouples used for temperature control and indicating;

The invention is more directly in the field of thermocouples wherein an outer thermocouple shield is formed of one of the two dissimilar thermocouple metals In one of several variations of this invention I use two concentric cylindrical members, each made of one of the two dissimilar metals. This particular variation has some very interesting qualities since a great area is involved for each of the two dissimilar metals increasing the response of the potential created by the heat to which they are subjected in use resulting in a thermocouple system having faster response, greater accuracy, more reliability, and longer useful life than systems heretofore in use. In another variation I utilize a first thermocouple member of the first of the two thermocouple metals with successive coatings of various materials including one coating of the second of the two thermocouple materials. In all of the variations of this invention a basic innovative feature is the use of one of the thermocouple metals surrounding the other thermocouple metal with additional protective and enhancing features.

II. Description of the Prior Art

Thermocouples are well known and in wide use. There have been so many thermocouple systems devised that it would be futile to attempt to list them in detail. However, I do not know of any thermocouple where one of the two dissimilar thermocouple metals surrounds the other of the two dissimilar thermocouple metals to create the electrical potential difference to determine the temperature as I have done in this invention. I have provided other improvements as well which will be detailed below.

SUMMARY OF THE INVENTION

Thermocouples are widely used to sense temperatures, particularly high temperatures. Thermocouples generally operate by sensing an electrical potential generated between two connected wires of dissimilar materials when subjected to temperature variations. The electrical potential generated is then converted to an indication of actual temperature as is known to those skilled in the art.

A basic thermocouple normally consists of a hollow, bullet shaped metallic shield with two dissimilar metallic connected wires within the shield. A glass seal or the like seals around the open end of the shield and also seals around the wires.

The interior of the thermocouple is packed with insulation material. The insulation is necessary to prevent the two wires from shorting at a position other than their one connection at one end of each wire. However, the insulation is also a major problem. The insulation reduces the sensitivity of the instrument. Additionally, the seal will randomly crack on cooling. When this occurs, the result can be the introduction of moisture into the insulation. Moist insulation contaminates the wires and their connection to each other (referred to as "poisoned" by those skilled in the art) and reduces sensitivity and may short the two wires.

With my invention, there is no longer a need for insulation. I accomplish this by forming the shield from one of the two dissimilar metals used to make a thermocouple work. I then attach a wire formed of the second of the two dissimilar metals to the interior of the bullet shaped shield. There is no requirement for insulation, thus the poisoning and other problems caused by the insulation are eliminated.

Being constructed in this manner my new thermocouple may be filled with an inert gas, the interior may be vacuumed, the shield may be coated inside and/or outside, or the interior of the shield may even be left open to the atmosphere. The wire inside the shield may be stretched tight to provide maximum sensitivity and accuracy.

In one interesting variation of my invention I form a thermocouple of two dissimilar metallic concentric tubes. One of the tubes is formed of the first of two dissimilar metals and the second tube is formed of the second of the two dissimilar metals. This provides for a large and uniform surface of each metal resulting in interesting time, sensitivity, and magnitude of response when the tubes are subjected to heat.

In what is, perhaps, the most innovative, useful and unique variation of my basic premise for thermocouples, I commence by forming a wire or the like made of the first of two thermocouple dissimilar metals. I then coat the wire or the like with a layer of non electrical conducting material, leaving a segment of the wire or the like not coated Next, I coat the non electrical conducting material and the not coated segment of wire or the like with a layer of the second of the two thermocouple metals. Now, I may, but am not required to, coat the entire wire with its previously recited coatings with a layer of corrosion resistant material or the like. Finally, by using clamps or other means clear to those skilled in the art I make an electrical contact to each of the two dissimilar thermocouple materials. These last mentioned two contacts are for connection to measuring instruments or the like.

It is an object of this invention to provide a thermocouple without insulation in the thermocouple shield;

Another object of this invention is to provide such a thermocouple which will be more sensitive and more accurate than previously known thermocouples;

Another object of this invention is to provide a thermocouple with a longer useful life than prior thermocouples:

Another object of this invention is to provide compact and miniature thermocouples of high sensitivity, long life, and maximum reliability.

The foregoing and other objects and advantages of this invention will become apparent to those skilled in the art upon reading the description of preferred embodiments, which follows, in conjunction with a review of the appended drawings.

BRIEF DESCRIPTION OF THE DRAWINGS

FIG. 4 is a schematic perspective of an alternate embodiment of this invention;

FIG. 5 is a section on 5—5 on FIG. 4.

FIG. 6 is a schematic perspective of another alternate embodiment of this invention;

FIG. 7 is a section on 7—7 on FIG. 6;

FIG. 8a is an elevation of the area 8a on FIG. 8; and

FIG. 9 is a schematic perspective of another alternate embodiment of this invention.

DESCRIPTION OF PREFERRED EMBODIMENTS

Figure 1:
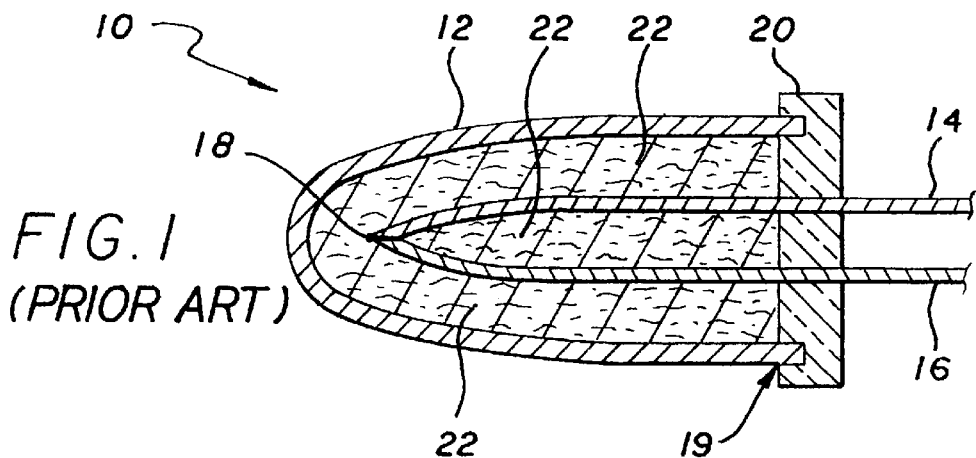
FIG. 1 is a schematic section of a thermocouple of the prior art.

An inventory of the drawing items bearing numerals:

| Item | Description |
|---|---|
| 10 | prior art thermocouple |
| 12 | shield |
| 14 | wire |
| 16 | wire |
| 18 | connection of wires |
| 19 | large end of sleeve |
| 20 | seal |
| 22 | insulation within thermocouple |
| 100 | thermocouple suitable to practice the method of this invention |
| 112 | shield |
| 114 | wire |
| 116 | wire |
| 117 | connection of wire to shield |
| 117a | clamp |
| 118 | connection of wire to shield |
| 119 | large end of shield |
| 120 | seal |
| 122 | space within thermocouple |
| 123 | coating |
| 124 | coating |
| 200 | thermocouple formed of two concentric cylinders |
| 212 | outer cylinder |
| 212a | wire |
| 214 | inner cylinder |
| 214a | wire |
| 218 | connector between cylinders |
| 230 | insulated spacers between cylinders |
| 232 | base support elements |
| 300 | alternate cylindrical thermocouple |
| 312 | double wall cylinder |
| 312a | outer cylinder of double wall cylinder |
| 312b | closed end of double wall cylinder |
| 312c | inner cylinder of double wall cylinder |
| 312d | wire lead of double wall cylinder |
| 314 | single cylinder within double wall cylinder |
| 314a | pointed contact element on the end of cylinder 314 |
| 314b | contact of 314a and 312b |
| 314d | wire lead of single cylinder 314 |
| 400 | alternate thermocouple of this invention |
| 412 | element formed of first of two thermocouple metals |
| 414 | coating of second of two thermocouple metals |
| 416 | where element 412 and coating 414 are in contact |
| 418 | lead wire |
| 418a | connection of 414 and 418 |
| 419 | lead wire |
| 419a | connection of 412 and 419 |
| 420 | non electrical conductive coating |
| 422 | protective coating |

Those skilled in the art will be well aware of the heretofore known construction and operation of thermocouples. The following description is not intended to be a complete description of the operation of thermocouples, but only a sufficient mention of the features to enable those interested to understand and practice my new invention.

FIG. 1 illustrates the construction of a basic thermocouple of the art prior to my present invention. The thermocouple normally consists of a hollow, bullet shaped, metallic (stainless steel or the like) shield 12 with two dissimilar metallic wires 14 and 16 connected at 18. A seal 20 of glass or the like seals around the end 19 of the shield and also seals around the wires 14 and 16. The dissimilar wires 14 and 16 will be, for example, Chromel (nickel chromium alloy) and Alumel (a nickel alloy with aluminum, manganese, silicon and constantan {nickel copper alloy]). Insulation material 22 fills the interior of the shield. The insulation is necessary to prevent the wires 14 and 16 touching or otherwise electrically discharging to each other at positions other than their joinder at 18.

There are many other thermocouples with added features, but the basic sensing arrangement is normally the same as that shown in FIG. 1.

Figure 2:
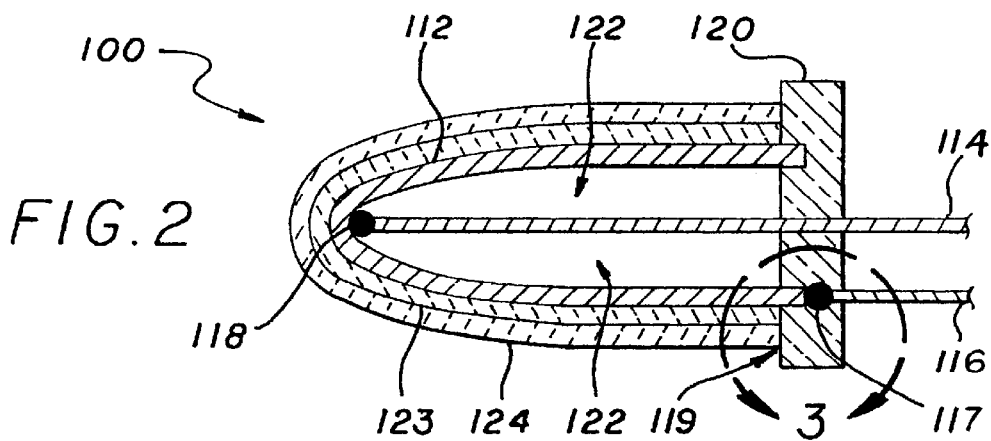
FIG. 2 is a schematic section of a thermocouple suitable to practice the method of this invention.
Figures 3, 8:
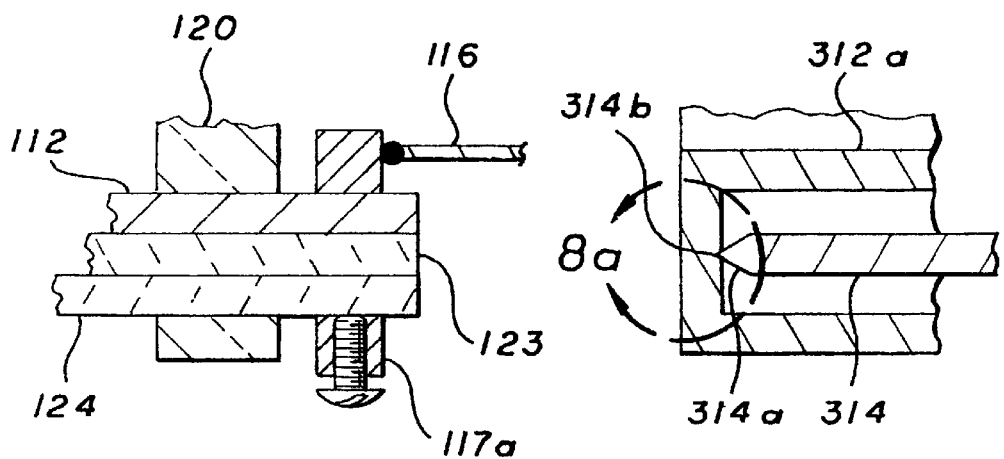
FIG. 3 is an enlarged view of the area 3 on FIG. 2.
FIG. 8 is an enlarged fragmentary section of the area 8 on FIG. 6.

FIG. 2 is a view similar to FIG. 1 showing a basic thermocouple sensing apparatus utilizing the features of my present invention. The shield 112 is formed of one of the two dissimilar metals such as the metals described above. The wire 114 is formed of the other metal such as described above. The wire 114 is welded or otherwise attached to the shield at 118. A lead wire 116 is welded or otherwise attached to the shield at 117. Alternately, as shown in FIG. 3, the shield 112 could extend through the seal and wire 116 could be clamped to the shield by a clamp 117a as will be understood by those skilled in the art The two wires 114 and 116 will then lead to instrumentation to convert potential differences to temperature readings as is known to those skilled in the art. The wire 114 can be stretched by means known to those skilled in the art to prevent sagging when subjected to heat in order to further enhance accuracy in operation. In FIG. 2 the shield 112 is shown as having two coatings 123 and 124. These coatings, or one of them, may be used or not. They may be plated, or otherwise applied, in a manner known to those skilled in the art to reduce the possibility of corrosion and contamination, to enhance heat transfer, to lower electrical resistance or one of many other purposes which may occur to those skilled in the art.

FIGS. 4 and 5 show another totally unique and valuable thermocouple using the basic premise of this invention. In this case the conductor shield 212 is in the form of a cylinder constructed of the first of the two dissimilar metals. The inner conductor cylinder 214 is made of the second of the two dissimilar metals. Lead wires 212a and 214a are attached at 212b and 214b to cylinders 212 and 214 respectively. The lead wires will go the instrumentation as is known to those skilled in the are. A series of insulator spacers 230, or other means known to those skilled in the art will maintain the two cylinders separated from each other. A pair of insulator base supports 232 will support this embodiment of the thermocouple either directly within a furnace, kiln, or the like or within a thermowell associated with the device for which the temperature values are being detected or other means known to those skilled in the will be used to maintain the thermocouple sensing device in the desired position.

FIGS. 6, 7, 8, and 8a show another version of the thermocouple with the two dissimilar metals in the shape of concentric cylinders 300.

In this form, one cylinder 312 is a double cylinder formed of the first of two dissimilar thermocouple metals. Outer cylinder element 312a has a closed end at 312b with its other end being open. Inner cylinder 312c is formed integrally with end 312b and outer cylinder 312a or is welded or otherwise connected to end 312b.

Cylinder 314 is located between cylinder elements 312a and 312c. Cylinder 314 is in contact with end 312b of the double cylinder 312 at 314b by one or more pointed tip element(s) 314a or the like. Cylinder 314 is held so that it is not in contact with cylinder element 312a and 321c by being welded or otherwise firmly connected at point 314b or by insulating spacers or other means which will be understood by those skilled in the art. Leads 312d and 314d are connected to cylinders 312 and 314 respectively by clamps or the like not visible, but understood by those skilled in the art).

FIG. 9 shows a most useful and valuable embodiment of a thermocouple sensing device 400 to practice the method of this invention, In this embodiment a member 412 (a wire or the like) formed of the first of two dissimilar thermocouple metals is coated with a layer or skin of non electrical conducting material 420. This layer or skin 420 is then covered by a skin 414 of the second of the two dissimilar thermocouple metals. Finally, a layer or skin 422 of a corrosion resistant material such as platinum or the like is applied over the skin 414. A pair of leads 418 and 419 are connected to skin 414 and element 412 at 418a and 419a by means known to those skilled in the art.

The application of the various layers or skins over the element 412 and over succeeding layers or skins will be by plating, dipping, spraying, powder coating and other means known to those skilled in the art. In the application of the very first layer or skin 420 of non electrical conducting material over the element 412 a small area 416 at the end, or some other location on element 412 will not be coated, or the coating will be removed at that area 416 before applying coating 414 of the second of the two dissimilar thermocouple materials. This will make the connection between metals 412 and 414. The layer or skin 422 can be of one material such as platinum or the like, or it may be a multi-layered skin of more than one coating.

In the various embodiments of this invention it is to be understood that normally lead wires and connections to the dissimilar metallic elements will normally be of the same metals as the respective elements. Also, where the lead wires or the like may pass through an electrically conductive shield or coating of material appropriate electrical insulation will be provided. These features will be clear to those skilled in the art.

In the claims which follow I may inadvertently fail to claim certain patentable features of this invention. In that event such failure to claim will be strictly unintentional and must not be interpreted as an intent to abandon or dedicate such features. In the event I shall discover that I have failed to claim any such features, I shall immediately seek to claim such features by re-issue or other appropriate means.

While the embodiments shown and described are fully capable of achieving the objects and advantages desired, such embodiments are for purposes of illustration and not for purposes of limitation.

I claim:

1. A thermocouple sensing element comprising: a first hollow cylindrical elongate electrically conductive member formed of a first metal of two dissimilar metals having a first open end and a second closed end; a second hollow cylindrical elongate electrically conductive member formed of the first of the two dissimilar metals electrically conductively connected to the closed end of said first member and extending from the closed end within the first hollow cylindrical elongate electrically conductive member; a third hollow cylindrical elongate electrically conductive member formed of a second of the two dissimilar metals open at both ends extending the length of, and between, the first hollow cylindrical elongate electrically conductive member and the second hollow cylindrical elongate electrically conductive member.

2. The thermocouple sensing element of claim 1 wherein the third hollow cylindrical elongate electrically conductive member contacts the closed end through at least one contact element connected to an edge of the third hollow cylindrical elongate electrically conductive member.

3. The thermocouple sensing element of claim 1 wherein the first, second, and third hollow cylindrical elongate electrically conductive members are each coated with a non-electrical conductive coating.

4. A method of making a thermocouple sensing element comprising: forming a first metal of two dissimilar metals suitable to generate an electrical potential under varying heat conditions into a first hollow cylindrical elongate electrically conductive member having a first open end and a second closed end; forming the first metal of the two dissimilar metals suitable to generate an electrical potential under varying heat conditions into a second hollow cylindrical elongate electrically conductive member having a first open end and a second open end and a diameter less than the diameter of the first hollow cylindrical elongate electrically conductive member; connecting the second open end of the second hollow cylindrical elongate electrically conductive member to the closed end of the first hollow cylindrical elongate electrically conductive member in such manner that the first and second hollow cylindrical elongate electrically conductive members are concentric with a space between them; forming the second metal of the two dissimilar metals into a third hollow cylindrical elongate electrically conductive member having a diameter less than the diameter of the first and greater than the diameter of the second hollow cylindrical elongate electrically conductive members; locating the third hollow cylindrical elongate electrically conductive member so that it is inside the first and outside the second hollow cylindrical elongate electrically conductive members and at a distance from the closed end of the first hollow cylindrical elongate electrically conductive member; and electrically conductively connecting the third hollow cylindrical elongate electrically conductive member to the closed end of the first hollow cylindrical elongate electrically conductive member.

5. The method of claim 4 wherein the electrically conductive connection of the third hollow cylindrical elongate electrically conductive member to the closed end of the first hollow cylindrical elongate electrically conductive member is a pointed appendage to an edge of the third hollow cylindrical elongate electrically conductive member.

* * * * *